Oct. 14, 1924.
E. MICHAUD
LOCKING DEVICE FOR AUTOMOBILES
Filed June 9, 1919
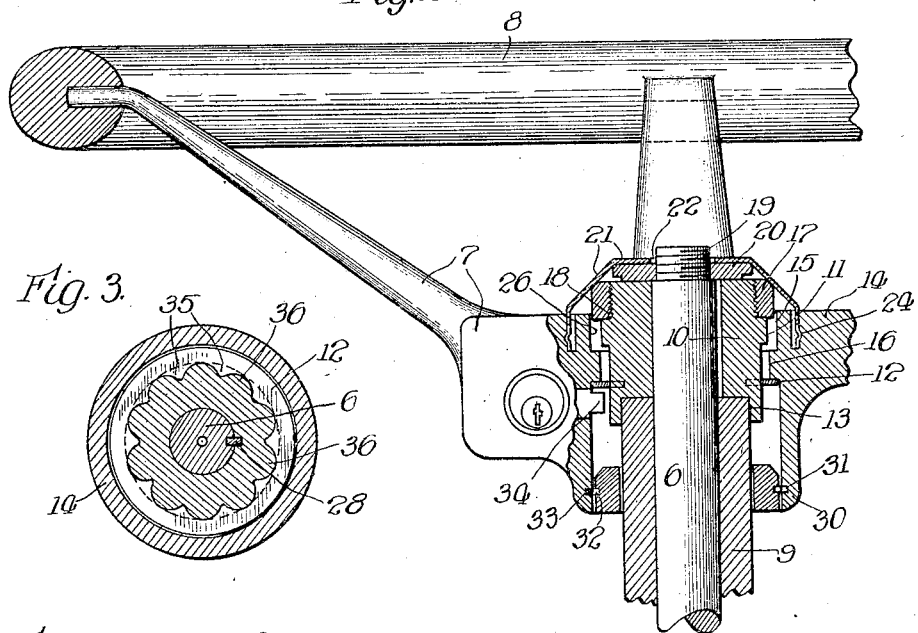
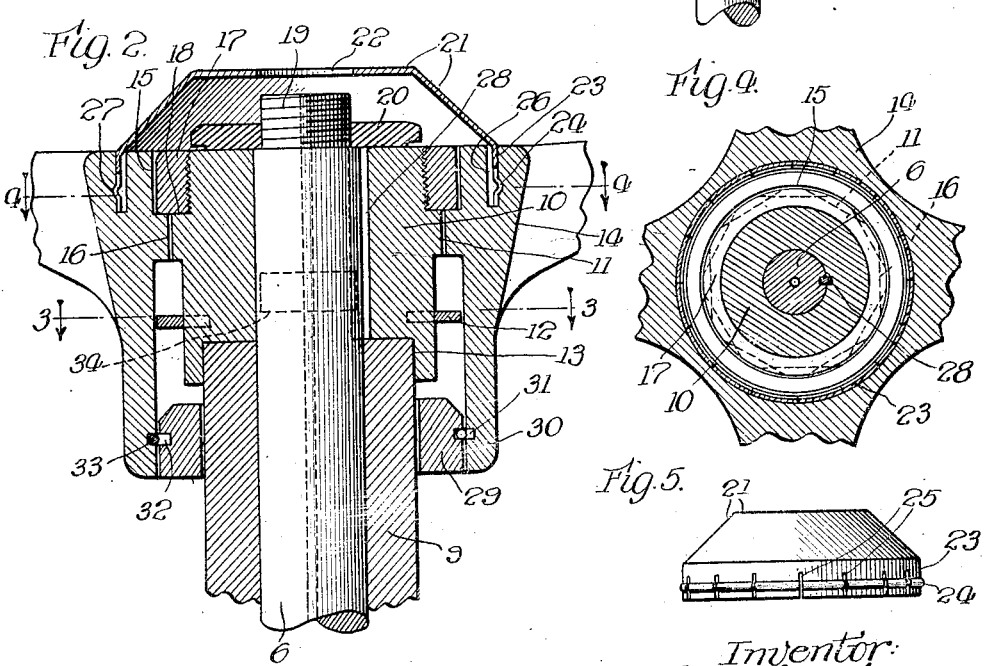
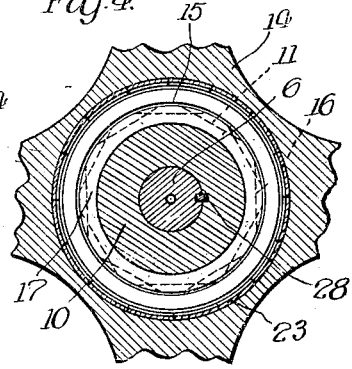
Witness:
Inventor:
Elzear Michaud
By Frank H Drury
Atty.

Patented Oct. 14, 1924.

1,511,351

UNITED STATES PATENT OFFICE.

ELZRAR MICHAUD, OF CHICAGO, ILLINOIS, ASSIGNOR TO CHARLES W. GILLETT, OF CHICAGO, ILLINOIS.

LOCKING DEVICE FOR AUTOMOBILES.

Application filed June 9, 1919. Serial No. 302,943.

*To all whom it may concern:*

Be it known that I, ELZRAR MICHAUD, a citizen of the United States, residing at Chicago, in the county of Cook and State of Illinois, have invented new and useful Improvements in Locking Devices for Automobiles, of which the following is a full, clear, concise, and exact description, reference being had to the accompanying drawing, forming a part of this specification.

My invention relates to improvements in locks for automobiles and has for its object, the production of a device by means of which a steering wheel may be practically locked in either steering or spinning position.

A further object is the production of a device by means of which tampering with the locking mechanism is prevented.

A further object is the production of a device by means of which locking of the machine in steering position without the use of the key is prevented.

A further object is the production of a device embodying unique strengthening means whereby the efficiency of the lock is enhanced.

These and such other objects as may hereinafter appear are attained by my device, embodiments of which are illustrated in the accompanying drawings in which—

Fig. 1 represents a sectional view of my improved device in spinning or operative position.

Fig. 2 represents an enlarged sectional view of my improved device in locked or operative position.

Fig. 3 represents a sectional view on the line 3—3 of Fig. 2 looking in the direction indicated by the arrows.

Fig. 4 represents a sectional view on the line 4—4 of Figure 2 looking in the direction indicated by the arrows.

Fig. 5 represents a perspective view of the hub.

Like numerals of reference indicate like parts in the several figures of the drawing.

Referring now to the drawings, 6, represents the steering post of an automobile on which is mounted through intermediate means fully described later, the usual steering wheel comprising a spider 7, and wheel 8; the steering post is positioned within the sleeve 9, and rigid with the machine. A hub 10, is rigidly mounted on the steering post above the sleeve 9, having a polygonal flange 11 near its upper end and a circumferential supporting flange 12 near its lower end. The hub at its lower end is bored as shown at 13 to receive the upper end of the sleeve 9.

The hub 14, of the spider is bored as indicated at 15, to receive the hub 10, and is provided with an inwardly projecting circumferential polygonal flange 16, corresponding in shape with the flange 11. In both instances, these flanges are shown as hexagonal.

The collar 17, is fitted about the top of the hub 10, resting on the top 18, of the flange 11, and fitting snugly against the inner periphery 15, of the spider hub. The top of the steering post is screw-threaded as shown at 19, and a nut 20, is screwed down against the top of the hub 10, holding it securely in place.

In order to absolutely prevent tampering with the top of the mechanism, I provide a cap 21, having a central opening 22, permitting the top of the steering post to project therethrough when the wheel is in spinning position.

The cap 21, is provided with a downwardly projecting circumferential flange 23, and around the outer periphery of this flange, the metal is pressed outwardly forming a circumferential bead 24. The flange is slotted in a number of places as indicated at 25. The upper portion of the hub 10 is provided with a circumferential channel adapted to receive the downwardly projecting flange 23, of the cap 21. The outer periphery of the circumferential channel is provided with a curved groove 27, adapted to act as a socket for the bead 24 holding it securely in position when the cap is slipped in place. It will be noted in this construction that with this cap in position about the steering post, the upper portion of the entire locking mechanism is protected against tampering, it being impossible to insert any instrument through the cap and do any tampering to said mechanism or to push any metal instrument between the parts to hold them in any desired position.

The cap is preferably constructed of spring steel and in its construction when slotted, the flange is sprung outwardly so that when it is slipped into the circumferential channel, the flange springs outwardly permitting the bead to fit within the groove and locking the cap in place, holding it securely against any attempt to remove it.

The hub is keyed on the driving shaft by any ordinary key, fitting within the keyway 28. A sliding collar 29, is fitted on the lower end of the sleeve 9, and completely filling the space between the sleeve and the lower end 30 of the spider. The inner periphery of the spider is formed with a circumferential groove or channel 31 and a corresponding groove or channel 32 is formed in the collar 29, and registering therewith. An ordinary circular spring 33, is fitted within the two channels. The tension of the spring is so arranged that when the collar with the spring fitting within the channel 32, is slipped up into place and the channels 31, and 32, register, the spring spreads apart, and locks the members securely together. It will be noted in this connection that the collar is free to turn on either the sleeve 9, or the inner periphery of the spider 30, so in the event that any instrument is forced between the sleeve and the flange, the spider will revolve on the collar and if an instrument is forced between the collar and the spider, both the spider and the collar will revolve on the sleeve 9. And in the event that both members are rigidly locked together, the steering wheel becomes rigid on the sleeve and it is impossible to operate the steering mechanism.

In prior forms of locking mechanism of this character with hub and flange integral, it has been found that when the car is locked in spinning position, it has been possible by the exercise of force, to shear off the flange 12, and force the wheel into steering position, thus rendering the lock absolutely ineffective.

This defect existing in prior construction is cured in my device by making the flange 12, of steel or hard metal so that it is absolutely impossible to force the locking bolt through and either raise or lower the wheel without the insertion of the key, and the turning back of the locking bolt.

The insertion of this flange in place within the hub is accomplished in a novel manner as shown in Figs. 2 and 3, in which the flange 12 is provided with projections or teeth 35, projecting inwardly and being embedded within the softer metal of the hub 10. It is evident that if the flange 12 was circular in its inner and outer periphery, and projected within the metal of sufficient depth to insure the stability of the flange itself, it would have the effect of separating the hub into two parts, an upper and lower portion, and the exercise of any considerable force would cause the hub to break along the lines of the flange. By this construction, however, the inner undulating contour periphery of the flange permits the soft metal to flow on either side of the projections and above and below the flange, thus locking it securely in place without destroying the strength of the hub itself, as between each projection or boss on the inner periphery of the flange is positioned a column 36, of soft metal.

As shown in Figure 2, with the wheel in locked position and steering the car, the locking bolt is positioned above the flange and as both the bolt and the flange are of hard metal there is no undue wearing of either surface as there would be in the event that the flange was of soft metal in which case, the bolt itself, might be forced into the body of the soft flange and interfering with the proper operation of the device.

It will be noted by the form of construction embodied in my complete lock, I have provided a device that is practically free from danger of tampering and at the same time, one that is of positive action and one in which no change whatever, can be made in the relative parts of the wheel and hub without use of the key.

Having thus described my invention, what I claim as new and desire to secure by Letters Patent is—

I claim—

1. In a device of the class described, in combination, with a steering post, a hub rigidly mounted thereon, a wheel having a hub mounted on said steering post hub, means for connecting the hubs in operative and inoperative relation, said wheel being slidable from an operative to an inoperative position, a flange of harder material than said steering post hub and having an irregular inner periphery, inset in said steering post hub, and projecting from the outer face thereof and a locking mechanism carried by said wheel including a lock bolt adapted to be thrown above or below said flange and hold said wheel in operative or inoperative position.

2. In a device of the class described, in combination, a steering post, a hub rigidly mounted thereon, a circumferential flange extending about the outer periphery of said hub, a wheel having a spider hub mounted on said steering post hub, means for connecting the hubs in operative and inoperative relation, said wheel being slidable from an operative to an inoperative position, the lower portion of said spider hub extending below the steering post hub, a sleeve rigid on the machine and surrounding said steering post, the upper end of said sleeve extending within the lower portion of said spider hub, and steering post hub, a collar slidably mounted on said sleeve below said steering post hub and slidably engaging the inner periphery of the lower portion of the spider hub and means for holding said collar in operative position.

3. In a device of the class described, in combination, a steering post, a hub rigidly mounted thereon, a circumferential flange extending about the outer periphery of said hub, a wheel with a spider hub mounted on said steering post hub, means for connecting the hubs in operative and inoperative relation, said wheel being slidable from an operative to an inoperative position, the lower portion of said spider hub extending below the steering post hub, a sleeve rigid on the machine and surrounding said steering post, the upper end of said sleeve extending within the lower portion of said spider hub and steering post hub, a collar slidably mounted on said sleeve below said steering post hub and slidably engaging the inner periphery of the lower portion of the spider hub, and means for holding said collar in operative position, said means comprising a spring member adapted to fit within oppositely disposed channels in the outer periphery of said collar and the inner periphery of said spider hub.

4. In a device of the class described, in combination, a steering post having a hub, a steering wheel slidably mounted thereon and adapted to be moved from an operative to an inoperative position, a hub for the steering wheel, means for connecting the hubs in operative and inoperative relation, locking mechanism adapted to retain said wheel in either position and means for preventing access to said locking mechanism, said means including a spring cap fitting over the top of said mechanism, and a collar revolubly secured within the hub of said wheel below said mechanism.

In witness whereof, I have hereunto subscribed my name.

ELZRAR MICHAUD.